United States Patent Office 2,882,320
Patented Apr. 14, 1959

2,882,320
CYCLIC KETONE

Lee C. Cheney, Fayetteville, and William B. Wheatley, Syracuse, N.Y., assignors to Bristol Laboratories Inc., Syracuse, N.Y., a corporation of New York No Drawing. Application August 16, 1957
Serial No. 678,532

1 Claim. (Cl. 260—586)

This invention relates to a new series of unsaturated ketones having utility as medicinal agents.

This application is a continuation-in-part of our prior, copending application Serial Number 339,934, filed March 2, 1953, now abandoned.

The compounds of the present invention have the formula

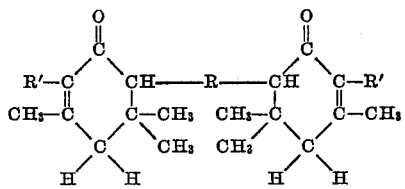

wherein R is an alkylene radical having six carbon atoms in the carbon chain thereof and R' is a member selected from the group consisting of hydrogen and hydroxyl.

The compounds of the present invention are useful therapeutic agents by virtue of their anti-stress activity. Thus the compounds of the present invention by systemic or oral administration exert a desirable anti-inflamatory effect upon such diseases as gout, collagen disease, arthritis, rheumatism and rheumatic fever. They also inhibit allergenic and immune reactions, e.g. such as occur in heterologous transplat of tissues.

The compounds of the present invention are useful aids in devising new pharmacological tests for cortisone-like agents; thus when rats are used as the test animal, a new test will not prove useful unless the inflammation or other signs of stress produced in the test are markedly reduced by the oral or intraperitoneal administration of 10 to 100 mgm./kg., e.g. as a 5 to 50% w./w. suspension in water containing 4% gum acacia or 0.5% carboxymethylcellulose.

Further understanding of the present invention is obtained by reference to the following examples.

Example I

A solution of isophorone (138.2 grams, 1.0 mole) in 200 ml. benzene is added dropwise to a stirred suspension of 39.0 grams (1.0) mole) sodium amide in 500 ml. benzene. Heat is applied and ammonia is evolved. The isophorone is added over about one hour and stirring and refluxing is continued for another two hours. A solution of 1,6-dibromohexane (122.0 gram, 0.5 mole) in 100 ml. benzene is added and the mixture is stirred under reflux for four to eighteen hours. Methanol is added to dissolve any unreacted sodium amide. Water is added with shaking and the aqueous layer is separated and discarded. The benzene layer is extracted twice with very dilute hydrochloric acid, then twice with a saturated aqueous solution of sodium chloride and then filtered through anhydrous sodium sulfate. The solvent is removed by distillation and the residue is distilled in vacuo. The product has the formula

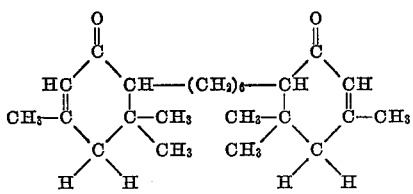

boils at about 157°–195° C. at one mm., crystallizes on cooling and melts at about 60.5°–62.0° C. (64.5°–66.0° corrected) after repeated recrystallization, as from Skellysolve B or methanol.

Analysis.—Calculated for $C_{24}H_{38}O_2$:

| Calculated | | Found | |
|---|---|---|---|
| C | 80.40 | C | 80.9 |
| H | 10.68 | H | 10.82 |

The product shows a positive qualitative test for ketones.

Example II

The product of Example I is converted into a compound having the formula

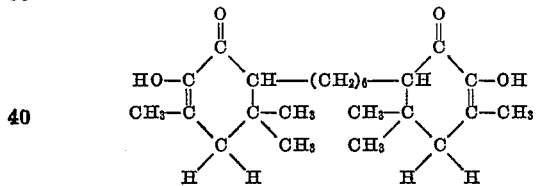

by the method of Treibs, Berichte 66B, 1483 (1933), of peracid oxidation followed by hydrolysis.

We claim:
The compound having the formula

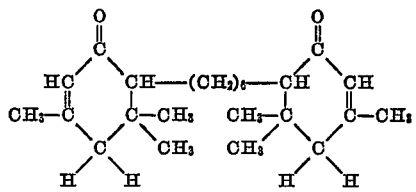

References Cited in the file of this patent

Rupe et al.: Helv. Chim. Acta, vol. 2, pp. 221–228 (1919).
Beilstein, vol. 7 (2nd supplement), p. 565 (1948).